(12) United States Patent
Shimamoto et al.

(10) Patent No.: US 11,144,803 B1
(45) Date of Patent: Oct. 12, 2021

(54) IMAGE PROCESSING APPARATUS, IMAGE FORMING APPARATUS, AND IMAGE PROCESSING METHOD FOR TEMPORARILY DELETING PAGE AREA OF RING BUFFER

(71) Applicant: KYOCERA Document Solutions Inc., Osaka (JP)

(72) Inventors: Kunihiko Shimamoto, Torrance, CA (US); Norifumi Miyahara, Torrance, CA (US); Kendrick Esperanza Wong, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/163,453

(22) Filed: Jan. 31, 2021

(51) Int. Cl.
*G06K 15/02* (2006.01)

(52) U.S. Cl.
CPC ..... *G06K 15/1817* (2013.01); *G06K 15/1807* (2013.01); *G06K 15/1865* (2013.01); *G06K 15/1886* (2013.01)

(58) Field of Classification Search
CPC ........... G06K 15/1817; G06K 15/1865; G06K 15/1886; G06K 15/1807
See application file for complete search history.

(56) References Cited

U.S. PATENT DOCUMENTS

| | | | |
|---|---|---|---|
| 9,875,192 B1* | 1/2018 | Allen | G06F 12/122 |
| 2001/0002078 A1* | 5/2001 | Kakigi | B65H 31/10 |
| | | | 271/292 |
| 2003/0231320 A1* | 12/2003 | Tsunekawa | G06K 15/1822 |
| | | | 358/1.2 |
| 2010/0060936 A1* | 3/2010 | Shitara | G06T 11/60 |
| | | | 358/1.18 |
| 2012/0084520 A1* | 4/2012 | Chou | G06F 11/1484 |
| | | | 711/162 |
| 2012/0194869 A1 | 8/2012 | Miyahara | |
| 2015/0242720 A1* | 8/2015 | Kitaguchi | H04N 1/32358 |
| | | | 358/1.13 |
| 2015/0339546 A1* | 11/2015 | Ito | G06K 15/181 |
| | | | 358/1.15 |
| 2016/0088189 A1* | 3/2016 | Atsumi | H04N 1/2104 |
| | | | 358/1.17 |
| 2018/0196732 A1* | 7/2018 | Dolev | G06F 9/45558 |
| 2018/0262647 A1* | 9/2018 | Idehara | H04N 1/4115 |

* cited by examiner

*Primary Examiner* — Nicholas Pachol
(74) *Attorney, Agent, or Firm* — Hawaii Patent Services; Nathaniel K. Fedde; Kenton N. Fedde

(57) ABSTRACT

Provided is an image processing apparatus that efficiently uses the ring buffer. A ring buffer is set in the storage unit. A page area setting unit allocates a maximum size page area in the page unit of the job in the ring buffer. A band storing unit stores band data while compressing the band data in the page area allocated by the page area setting unit. An image processing unit performs image processing on the band data. A temporary deletion unit sets the page area including the band data into a temporary deletion state in which overwriting is possible at a specific timing. Here, when the band data of the page is needed again and the temporarily deleted page area is not overwritten, the page area setting unit reuses the page area.

15 Claims, 8 Drawing Sheets

IMAGE PROCESSING APPARATUS, IMAGE FORMING APPARATUS, AND IMAGE PROCESSING METHOD FOR TEMPORARILY DELETING PAGE AREA OF RING BUFFER

BACKGROUND

The present disclosure relates to an image processing apparatus, an image forming apparatus, and an image processing method, and more particularly to an image processing apparatus, an image forming apparatus, and an image processing method capable of printing band data.

There is an image forming apparatus such as a multi-functional peripheral (MFP) capable of printing documents and images.

As a typical image forming apparatus, there is a technology that manages in a certain block unit or in a ring buffer in order to perform printing without causing print failure even when the remaining amount of the ink cartridge is low is disclosed. With this technology, to store all the image data for one job in the ring buffer is not necessary.

SUMMARY

An image processing apparatus according to the present disclosure includes: a storage unit configured to be set with a ring buffer; a page area setting unit configured to allocate a maximum-sized page area for each page of a job in the ring buffer set in the storage unit; a band storing unit configured to store band data while compressing in the page area allocated in the page area setting unit; an image processing unit configured to perform image processing of the band data stored by the band storing unit; and a temporary deletion unit configured to set the page area having the band data performed image processing by the image processing unit to a temporary deletion state allowing to be overwritten at a specific timing; wherein the page area setting unit, when the band data of the page is needed again and the page area set to the temporary deletion state by the temporary deletion unit is not overwritten, reuses the page area.

An image forming apparatus of the present disclosure includes: a storage unit configured to be set with a ring buffer; a page area setting unit configured to allocate a maximum-sized page area for each page of a job in the ring buffer set in the storage unit; a band storing unit configured to store band data while compressing in the page area allocated by the page area setting unit; an image processing unit configured to perform image processing of the band data stored by the band storing unit; an image forming unit configured to form an image of the band data performed image processing by the image processing unit; and a temporary deletion unit configured to set the page area where all the band data is image-formed by the image forming unit to a temporary deletion state allowing to be overwritten; wherein the page area setting unit, when the band data of the page is needed again and the page area set to the temporary deletion state by the temporary deletion unit is not overwritten, reuses the page area.

An image processing method of the present disclosure is executed by an image processing apparatus and includes the steps of: setting a ring buffer; allocating a maximum-sized page area for each page of a job in the ring buffer that is set; storing band data while compressing in the page area that is allocated; performing image processing of the band data that is stored; setting the page area having the band data performed image processing to a temporary deletion state allowing to be overwritten at a specific timing; and reusing the page area when the band data of the page is needed again and the page area set to the temporary deletion state is not overwritten.

DETAILED DESCRIPTION

Embodiment

[Control Configuration of Image Forming Apparatus 1]

Figure 1:
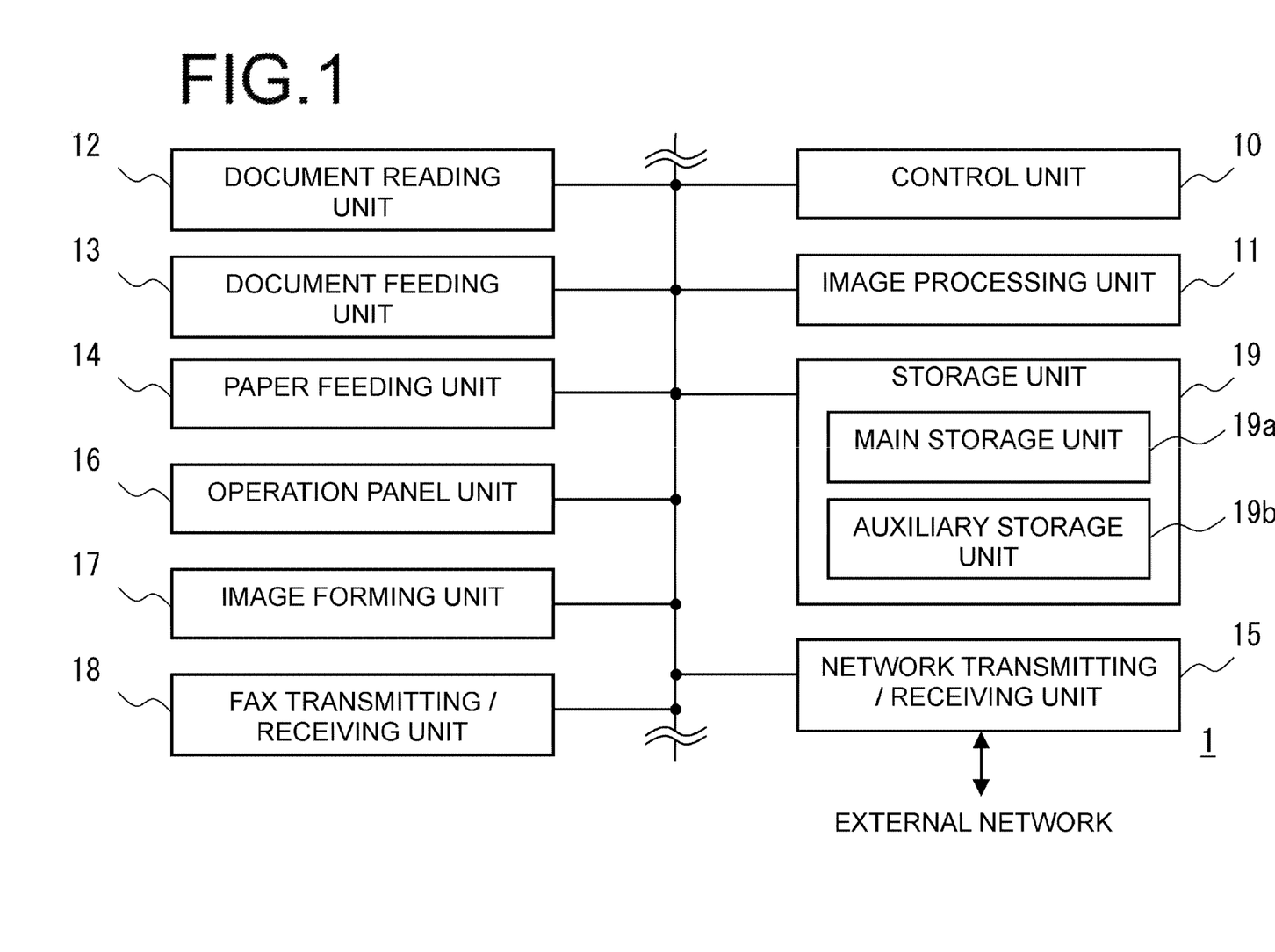
FIG. 1 is a block diagram showing a control configuration of an image forming apparatus according to an embodiment of the present disclosure.

At first, with reference to FIG. 1, a system configuration of an image forming apparatus 1 according to an embodiment of the present disclosure will be described.

The image forming apparatus 1 includes an image processing unit 11, a document reading unit 12, a document feeding unit 13, a paper feeding unit 14, a network transmitting/receiving unit 15, an operation panel unit 16, an image forming unit 17, a FAX transmitting/receiving unit 18, and a storage unit 19, or the like, are included. Each unit is connected to the control unit 10 and its operation is controlled by the control unit 10.

The control unit 10 is an information processing unit such as a GPP (General Purpose Processor), a CPU (Central Processing Unit), an MPU (Micro Processing Unit), a DSP (Digital Signal Processor), a GPU (Graphics Processing Unit), or the like.

The control unit 10 reads the control program stored in the ROM or HDD of the storage unit 19, expands the control program in the RAM, and executes the control program to operate as each unit of the functional blocks as described later. Further, the control unit 10 controls the entire apparatus in response to an indication information input from an external terminal or the operation panel unit 16.

The image processing unit 11 is a control calculation unit such as an ASIC (Application Specific Integrated Circuit), a DSP (Digital Signal Processor), a GPU (Graphics Processing Unit), or the like, dedicated to image processing. The image processing unit 11 performs image processing the image data. The image processing may be processing such as scaling, density adjustment, gradation adjustment, image improvement, or the like.

Further, the image processing unit 11 stores the image, which is read by the document reading unit 12, in the storage unit 19 as print data. At this time, the image processing unit 11 can also convert the print data into a file of an electronic document such as PDF or the like, or an image data such as TIFF or the like. Further, the image processing unit 11 may be capable of executing at least a part of OCR (Optical Character Recognition) processing.

The document reading unit 12 reads the set document. Further, the document reading unit 12 is arranged above the main body of the image forming apparatus 1.

The document reading unit 12 includes a scanner, a platen glass, and a document reading slit. When reading a document placed on the platen glass, the document reading unit 12 moves the scanner to a position facing the platen glass and reads the document placed on the platen glass while scanning to obtain image data. Then, the acquired image data is output to the control unit 10.

Further, when reading the document fed from the document feeding unit 13, the document reading unit 12 moves the scanner to a position facing the document reading slit. Then, the document reading unit 12 reads the document through the document reading slit in synchronism with the document feeding operation by the document feeding unit 13 and acquires image data. The document reading unit 12 outputs the acquired image data to the control unit 10.

The document feeding unit 13 conveys a document read by the document reading unit 12. The document feeding unit 13 is arranged above the document reading unit 12.

The document feeding unit 13 includes a document placing unit and a document transport mechanism. The document feeding unit 13 sequentially feeds the documents placed on the document placing unit one by one by a document feeding mechanism and feeds the documents to the document reading unit 12.

The paper feeding unit 14 feeds the recording sheet one by one toward the image forming unit 17. The paper feeding unit 14 is provided in the main body.

The network transmitting/receiving unit 15 is a network connecting unit including a LAN board for connecting to an external network, a wireless transceiver, and the like. The external network of this embodiment is, for example, a LAN, a wireless LAN, a WAN, a mobile telephone network, a voice telephone network, or the like. The network transmission/reception unit 15 transmits/receives data via a data communication line and transmits/receives a voice signal via a voice telephone line.

The operation panel unit 16 includes an input unit such as a button, a touch panel, and the like, and a display unit such as an LCD (Liquid Crystal Display), an organic EL display, and the like. The operation panel unit 16 is arranged on the front side of the image forming apparatus 1.

The buttons on the input unit of the operation panel unit 16 are a numeric pad, buttons for starting, canceling, switching operation modes, issuing instructions regarding job execution, or the like. The operation mode may include a mode such as copying, fax transmission, scanner, network scanner, and the like. Further, the job includes printing, transmitting, saving, recording, or the like, for the selected document. The input unit of the operation panel unit 16 acquires instructions of various jobs of the image forming apparatus 1 by the user. Moreover, inputting and changing the information of each user according to the user's instruction acquired from the operation panel unit 16 can be performed.

The image forming unit 17 causes an image to be formed on a recording sheet from data stored in the storage unit 19, read by the document reading unit 12, or acquired from an external terminal according to a user's output instruction.

The image forming unit 17 includes a photosensitive drum, an exposure unit, a development unit, a transfer unit, a fixing unit, and the like. The image forming unit 17 records a toner image on a recording sheet by executing an image forming process including charging, exposing, developing, transferring, and fixing.

The FAX transmitting/receiving unit 18 transmits/receives a facsimile. The FAX transmitting/receiving unit 18 can receive a facsimile from another FAX apparatus via a voice line, stores it in the storage unit 19, and causes the image forming unit 17 to form an image. Further, the FAX transmitting/receiving unit 18 can convert a document read by the document reading unit 12 or data of a network FAX transmitted from an external terminal into image data and can be facsimile-transmitted to another FAX apparatus via a voice line.

The storage unit 19 is a non-transitory recording medium.

In this embodiment, the storage unit 19 includes a main storage unit 19*a* and an auxiliary storage unit 19*b*.

The main storage unit 19*a* is a main storage such as various RAMS such as DRAM (Dynamic Random Access Memory) and SRAM (Static Random Access Memory). The main storage unit 19*a* stores programs, data, temporary files, buffer data, and the like. The DRAM of the main storage unit 19*a* may retain the stored contents by a function such as self-refreshing even in the power saving state.

The auxiliary storage unit 19*b* is an auxiliary storage such as a ROM (Read Only Memory), an HDD (Hard Disk Drive), and an SSD (Solid State Drive). The auxiliary storage unit 19*b* may have a larger storage capacity than the main storage unit 19*a*. Further, the auxiliary storage unit 19*b* stores a control program for controlling the operation of the image forming apparatus 1. The control program includes an OS (Operating System) and application software for printing or the like (hereinafter simply referred to as "application"). Further, the document data is also temporarily stored in the auxiliary storage unit 19*b*. In addition, in the storage unit 19, the account setting of the user is also stored. Further, the storage unit 19 may include a storage folder area for each user (hereinafter referred to as "document box"). In addition, the auxiliary storage unit 19*b* may include a storage class memory that is slower than the main storage unit 19*a* but has a larger capacity and a higher speed than an HDD, or the like.

In the image forming apparatus 1, the control unit 10 and the image processing unit 11 may be integrally-formed, such as a CPU with a GPU, a chip-on-module package, or an SOC (System On a Chip).

Further, the control unit 10 and the image processing unit 11 may be configured integrally with the storage unit 19 or may each include a recording medium such as a RAM or a ROM.

[Functional Configuration of Image Forming Apparatus 1]

Figure 2:
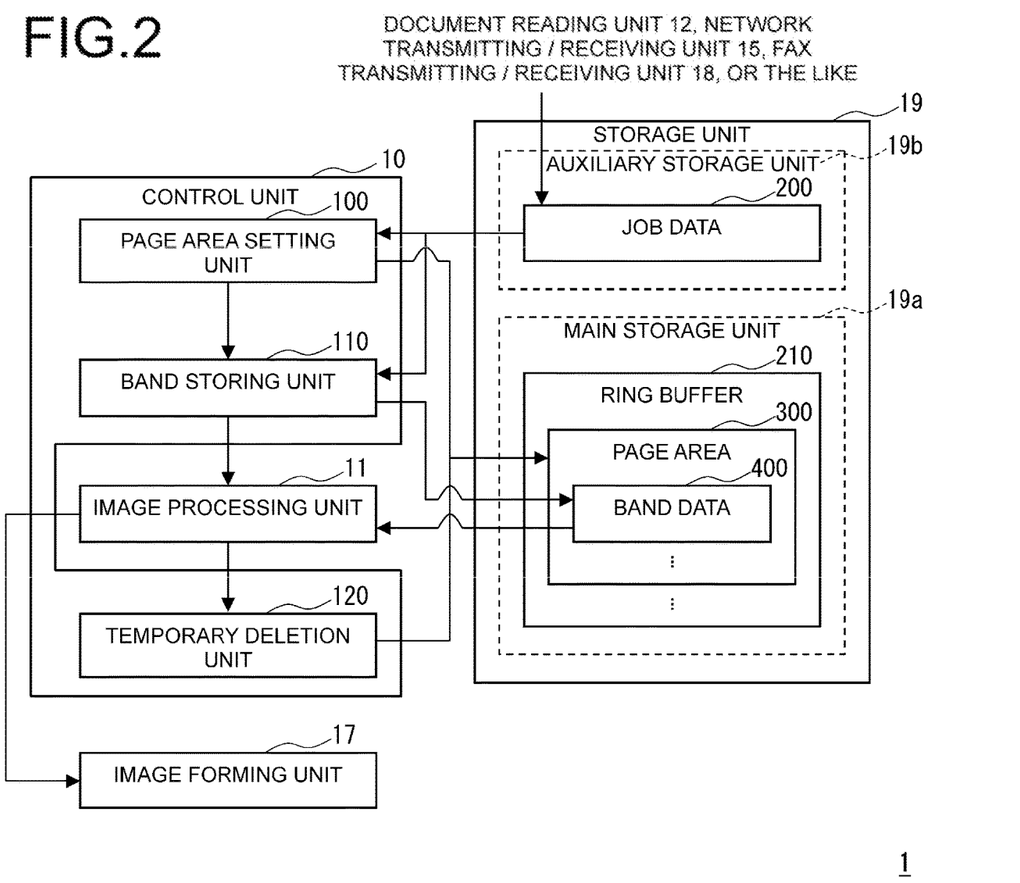
FIG. 2 is a block diagram showing a functional configuration of the image forming apparatus according to the embodiment of the present disclosure.

Here, the functional configuration of the image forming apparatus 1 is described with reference to FIG. 2.

The control unit 10 of the image forming apparatus 1 includes a page area setting unit 100, a band storing unit 110, and a temporary deletion unit 120.

A ring buffer 210 is set in the main storage unit 19*a* of the storage unit 19. The auxiliary storage unit 19*b* stores job data 200.

The page area setting unit 100 allocates the page area 300 of the maximum size in the page unit of the job in the ring buffer 210 set in the storage unit 19. In this embodiment, once the band data 400 of the page image-formed by the image forming unit 17 is needed again, the page area setting unit 100 determines whether or not the page area 300 is set to the temporary deletion state. Then, the page area setting unit 100 determines whether or not the page area 300 set to the temporary deletion state has been overwritten. At this time, the page area setting unit 100 makes this determination in units of band data 400. Then, if the page area 300 has not been overwritten, the page area setting unit 100 reuses the page area 300. On the other hand, if the page area 300 has already been overwritten, the page area setting unit 100 newly allocates the page area 300.

Specifically, the page area setting unit 100 can determine that the band data 400 of the page is needed again if the copy printing is set for the job and/or when the job is reprinted. Here, the copy printing of the present embodiment is a print setting such as printing a plurality of copies for one job.

When printing a plurality of copies, pages may be sorted, or the like. Also, for a case of reprinting a job, the page area setting unit 100 can determine that reprinting is necessary when a paper jam occurs.

The band storing unit 110 stores the band data 400 while compressing in the page area 300 allocated in the page area setting unit 100. At this time, the band storing unit 110 compresses the image data for each page based on the job data 200 in band units. In the present embodiment, the band indicates that the image data for each page is divided for efficient processing by the image processing unit 11.

The temporary deletion unit 120 sets the page area 300 including the band data 400 image-processed by the image processing unit to a temporary deletion state, which is allowed to be overwritten, at a specific timing. In the present embodiment, the specific timing may be the timing when the image forming unit 17 receives the notification that all the band data 400 has been image-formed. That means, the temporary deletion unit 120 that has received this notification sets the page area 300 to the temporary deletion state that permits to be overwritten. In this case, for example, in a memory management table of the OS or print application, the state of the page area 300 is set from "allocated" to "temporary deletion". In the present embodiment, "allocated" indicates that the area is in use and is in a state that is prohibited to be overwritten. On the other hand, "temporary deletion" indicates a state in which the stored content is held but being allowed to be overwritten.

In the present embodiment, the image processing unit 11 performs image processing of the band data 400 stored by the band storing unit 110.

The image forming unit 17 forms an image of the band data 400 image-processed by the image processing unit 11. In this time, in a state after charging, exposing, and developing, and once the image being formed on the intermediate transfer belt, the image forming unit 17 may notify to the temporary deletion unit 120 that the image formation is completed.

The ring buffer 210 is a buffer that stores image data for the image processing unit 11 to perform image processing during printing. In the present embodiment, the ring buffer 210 has a specific capacity allocated in the memory space, and the page area 300 is allocated in page units from the beginning (head) to the end. Further, in the ring buffer 210, when a page area 300 having a capacity larger than the capacity from the reservation start position to the reservation end position is needed, the old page area 300 is released in order and a new page area 300 is allocated. As a result, the ring buffer 210 stores each page area 300 in a ring shape. In each allocated page area 300, compressed band data 400 is stored in band units. Regarding the allocation of the page area 300 and the band data 400, for example, the address in the memory space and the reserved state are set in a memory management table. In this memory management table, addresses and states of each page area 300 and band data 400 on the ring buffer 210 are set. This state includes the above-mentioned temporary deletion state.

The job data 200 is data of a job processed by the image forming apparatus 1. In the present embodiment, the job data 200 uses data of jobs such as printing, copying, facsimile reception, network facsimile reception, or the like. These are jobs in which the image forming unit 17 forms an image. In the present embodiment, the job data 200 is various types of uncompressed or compressed image data or various types of document data. Specifically, the various types of document data may be, for example, an electronic document file such as PDL (Page Description Language), PS (Post Script®), PDF (Portable Document Format), and the like, structured document files such as XML (Extensible Markup Language), HTML (Hyper Text Markup Language), and the like, application files for word processors, spreadsheet software, presentation software, or the like, a plain text file, or the like.

Here, the control unit 10 of the image forming apparatus 1 is caused to function as the page area setting unit 100, the band storage part 110, and the temporary deletion unit 120 by executing the control program stored in the storage unit 19.

Further, each unit of the above-described image forming apparatus 1 becomes a hardware resource that executes the image processing method of the present disclosure.

In addition, some or all of the functions described above may be also possible to be configured with the image processing unit 11. Further, a part or an arbitrary combination of the above-mentioned functional configurations may be configured in terms of hardware or circuit by IC, programmable logic, FPGA (Field-Programmable Gate Array), or the like.

[Image Process for Printing by Image Forming Apparatus 1]

Next, as refer to FIGS. 3 to 8, a description of the image process for printing by the image forming apparatus 1 according to an embodiment of the present disclosure.

Figure 3:
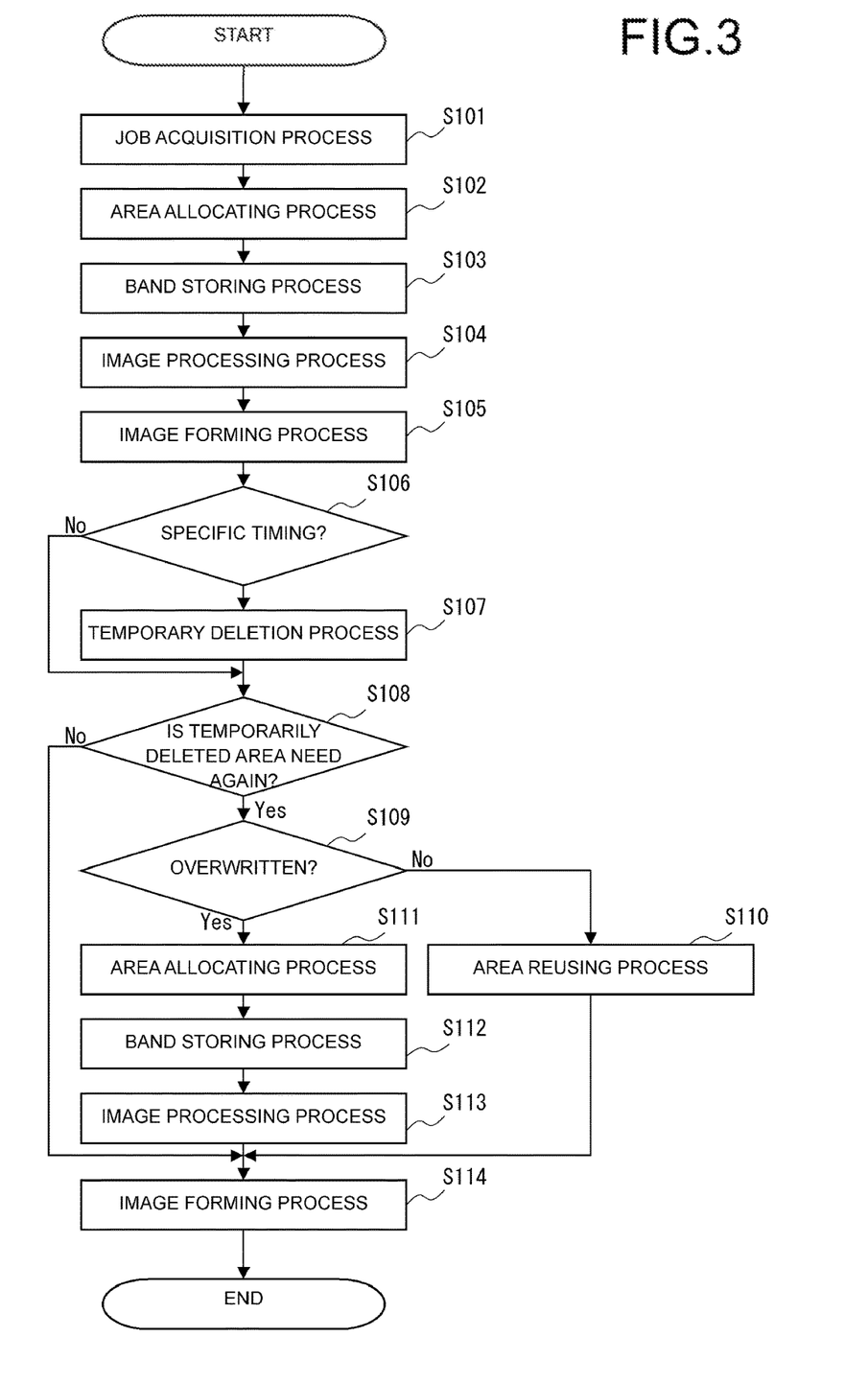
FIG. 3 is a flowchart of imaging process for printing according to the embodiment of the present disclosure.

In the image process for printing of the present embodiment, mainly, the control unit 10 and the image processing unit 11 execute the control program stored in the storage unit 19 or the control program stored in the image processing unit 11 in cooperation with each unit by using hardware resources.

Hereinafter, the details of the imaging process for printing is described step by step with reference to the flowchart of FIG. 3.

(Step S101)

At first, the page area setting unit 100 performs a job acquisition process. When copying is instructed on the operation panel unit 16 and the document is read by the document reading unit 12, the page area setting unit 100 acquires this image data as the job data 200. Otherwise, the page area setting unit 100 acquires the facsimile image data received by the FAX transmitting/receiving unit 18 as the job data 200.

Alternatively, the page area setting unit 100 acquires document data from a PC (Personal Computer) or the other terminal via the network transmitting/receiving unit 15, from a USB (Universal Serial Bus) memory, via a short-range wireless communication, or the like. The page area setting unit 100 acquires this document data as job data 200. In addition, the page area setting unit 100 may be acquired a document data stored in an external server or a document box as the job data 200.

The page area setting unit 100 analyzes the acquired job data 200, generates image data in page units, and stores the image data in the auxiliary storage unit 19*b*. When the job data 200 is document data, the page area setting unit 100 draws (renders) it in page units and acquires image data in page units. Further, the image data in page units may be included in the job data 200, even if it a separate file associated with the job data 200.

In addition, the page area setting unit 100 also sets, in the job data 200, instruction information indicating what kind of printing is to be performed. This instruction information is set based on the type of the job data 200, the metadata of the document data, the instruction from the operation panel unit 16 or the PC, the account setting of the user, and the like. Specifically, the instruction information includes settings such as copy printing, color printing, monochrome (black and white) printing, single color printing, aggregate printing, poster printing, other format settings, a watermark, and the like.

(Step S102)

Next, the page area setting unit 100 performs area allocating process.

The page area setting unit 100 allocates the page area 300 having the maximum size in page units. This maximum size is, for example, the capacity when the compression rate becomes the lowest when all the band data 400 of the page are compressed. That is, this size may be calculated as the maximum capacity on the algorithm when it is the least compressible. Specifically, this maximum size may be the maximum capacity is calculated by adding the capacity of the uncompressed image data with the capacity of the data such as the tag for compression, or the like.

In addition, the page area setting unit 100 may set "allocated" (in use) in the memory management table when allocating the page area 300 of each page. Further, the page area setting unit 100 may set the ID and page number of the job data 200, the range of addresses in the allocated memory space, and the allocating time information in the memory management table.

At this time, if the page area setting unit 100 cannot allocate the page area 300 of the maximum size, it can release the page area 300 from the oldest allocated page. The page area setting unit 100 may also set this releasing in the memory management table.

Figure 4:
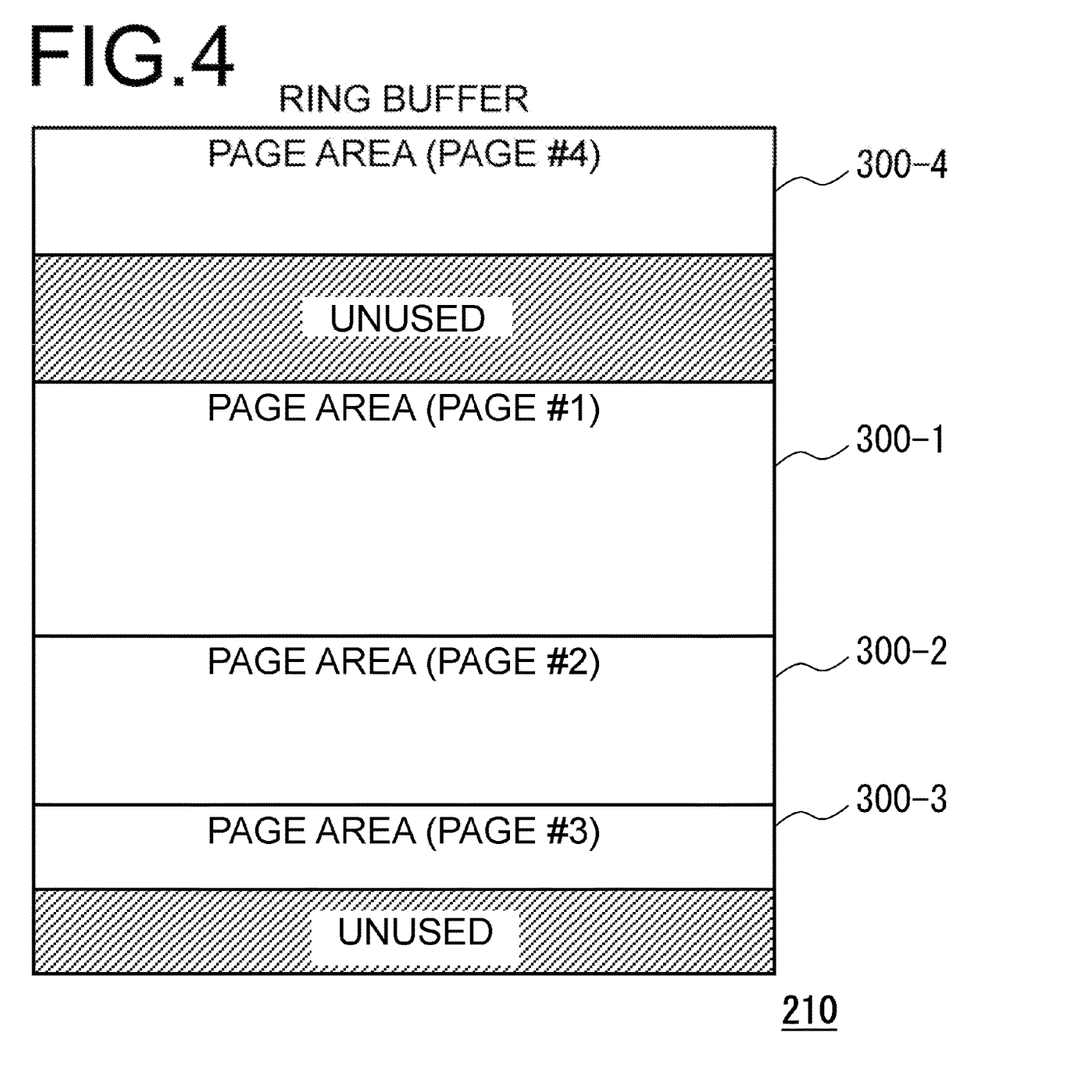
FIG. 4 is a conceptual diagram of the imaging process for printing as shown in FIG. 3.

FIG. 4 shows an example of the page area 300-1 to the page area 300-4 allocated in this way from the first page (Page #1) to the fourth page (Page #4). In this example, on the ring buffer 210, the area on the memory space between the page area 300-4 and the page area 300-1 and between the page area 300-3 and the end are unused areas that are not in use.

(Step S103)

Next, the band storing unit 110 performs band storing process.

The band storage unit 110 reads the image data for each page of the job data 200 from the HDD, or the like, of the auxiliary storage unit 19*b* and divides it into band data 400. Then, the band storage unit 110 stores the band data 400 in the allocated page area 300 while compressing the band data 400 itself.

(Step S104)

Next, the image processing unit 11 performs image processing process.

The image processing unit 11 sequentially performs image processing of the band data 400 stored in the page area 300 of the ring buffer 210. At this time, the image processing unit 11 can also decompress the compressed band data 400 to perform processing.

(Step S105)

Next, the image forming unit 17 and the page area setting unit 100 perform image forming process.

The image forming unit 17 forms an image of the band data 400 image-processed by the image processing unit for each page. As a result, an image corresponding to the band data 400 is formed on the recording sheet and printed out. Note that the band data 400 may be output after the document data is generated and transmitted by e-mail, or the like, facsimile transmission by the FAX transmitting/receiving unit 18, or storage in the document box.

(Step S106)

Next, the temporary deletion unit 120 determines whether or not it is a specific timing. For example, for each page area 300, if all the image-processed band data 400 in the page is image-formed, the temporary deletion unit 120 determines Yes because it is the specific timing.

Here, the temporary deletion unit 120 does not necessarily wait until the discharge of the recording sheet to the discharge tray is completed, and the stage when the image formation is completed on the intermediate transfer belt, or the like, and is in the state before fixing, determines Yes. The temporary deletion unit 120 determines No in other cases.

In the case of Yes, the temporary deletion unit 120 advances the process to step S107.

In the case of No, the temporary deletion part 120 advances a process to step S108.

(Step S107)

In the case of the specific timing, the temporary deletion unit 120 performs the temporary deletion process.

The temporary deletion unit 120 sets the page area 300, which has been image-formed, into the temporary deletion state. Specifically, the temporary deletion unit 120 sets, for example, the location of the page area 300 of the memory management table from "allocated" to "temporary deletion".

Figure 5:
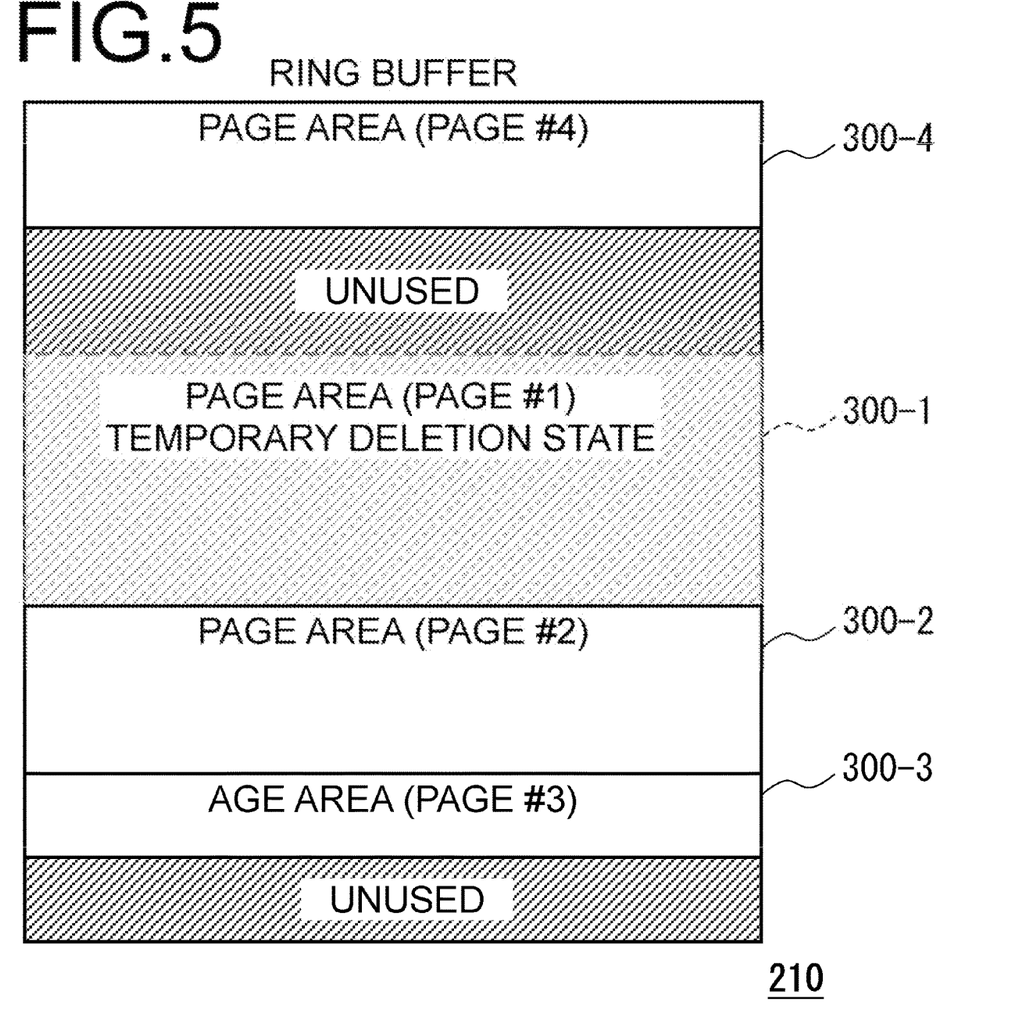
FIG. 5 is a conceptual diagram of the imaging process for printing as shown in FIG. 3.

FIG. 5 shows an example in which the page area 300-1 is in the state of temporary deleted.

In this state, the unused area between the page area 300-4 and the page area 300-2 and the temporarily deleted page area 300-1 can be allocated as the page area 300.

That is, the temporary deletion unit 120 reserves the location of the page area 300 corresponding to the page where output, or the like, has been completed as the page area 300 corresponding to the other page. At this time, the temporary deletion unit 120 allows it to be overwritten.

However, in this temporary deletion, the band data 400 is still held and reusable before it is overwritten.

(Step S108)

Here, the page area setting unit 100 determines whether or not the temporarily deleted page area 300 is needed again. The page area setting unit 100 determines Yes if the band data 400 of the page is needed again. Specifically, if the copy printing is set in the job data 200 and/or if the job is to be reprinted, the page area setting unit 100 determines that the band data 400 of the page is necessary again and thus determines Yes. As a case of reprinting the job, for example, if printing is stopped due to paper jam, or the like, the page area setting unit 100 determines Yes. The page area setting unit 100 determines No in other cases.

In the case of Yes, the page area setting unit 100 advances the process to step S109.

If the case of No, the page area setting unit 100 advances the process to step S114.

(Step S109)

If the page area 300 is needed again, the page area setting unit 100 determines whether or not it has been overwritten. If the band data 400 of the page for the page area 300 temporarily deleted by the temporary deletion unit 120 is needed again, the page area setting unit 100 determines whether or not the temporarily deleted page area 300 is overwritten in band data 400 units.

This determination is specifically described with reference to FIGS. 6 and 7.

Figure 6:
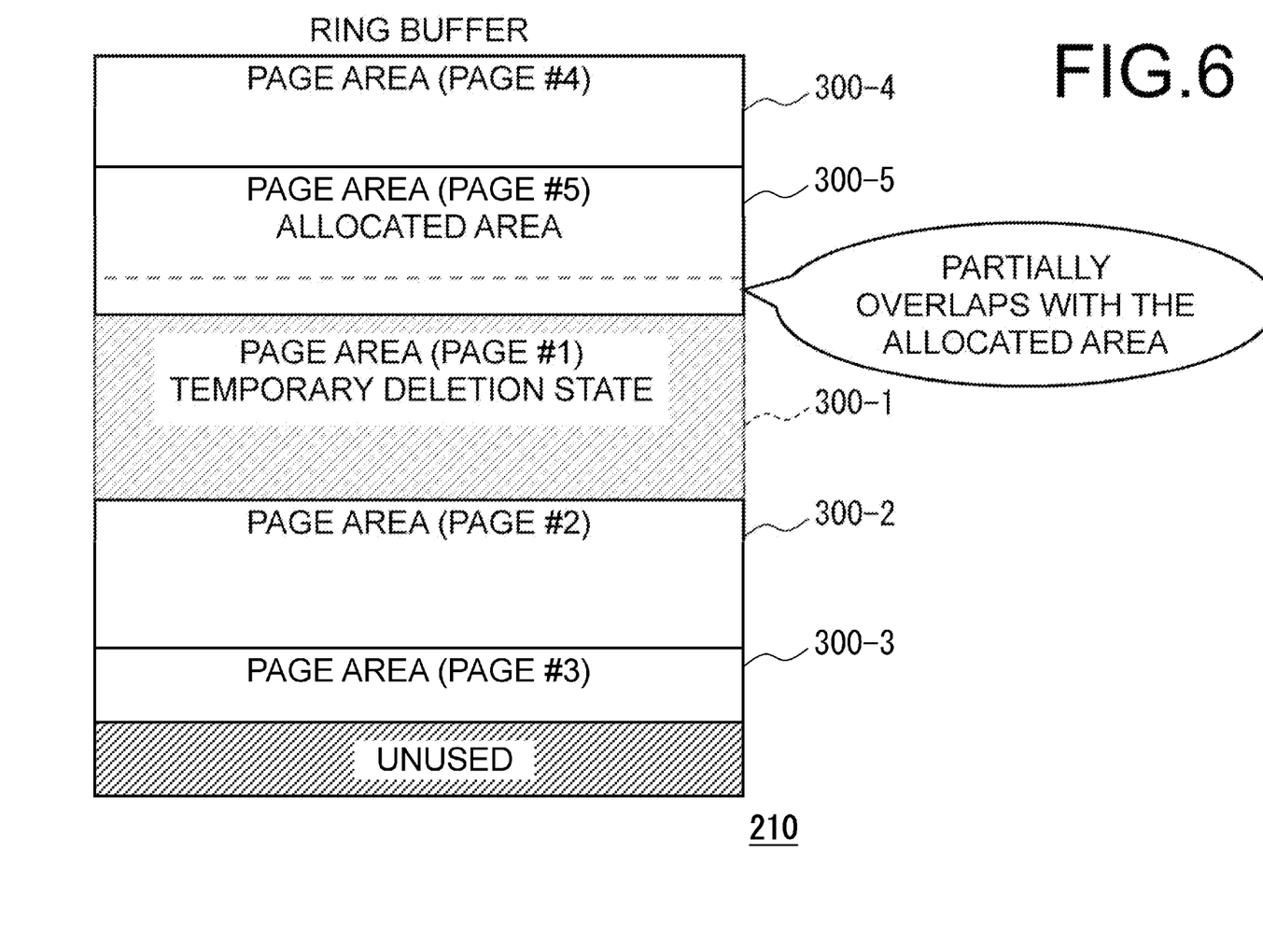
FIG. 6 is a conceptual diagram of the imaging process for printing as shown in FIG. 3.

FIG. 6 shows an example that the processing of the first page is completed, and the first page (Page #1) is temporarily deleted, and then the page area 300 of the fifth page (Page #5) is temporarily allocated with the maximum size, that is, the size when the compression rate is the lowest. Here, the page area 300-5 (Page #5) of the fifth page is allocated partially overlapping with the page area 300-1 (Page #1) in the temporarily deletion state.

Figure 7:
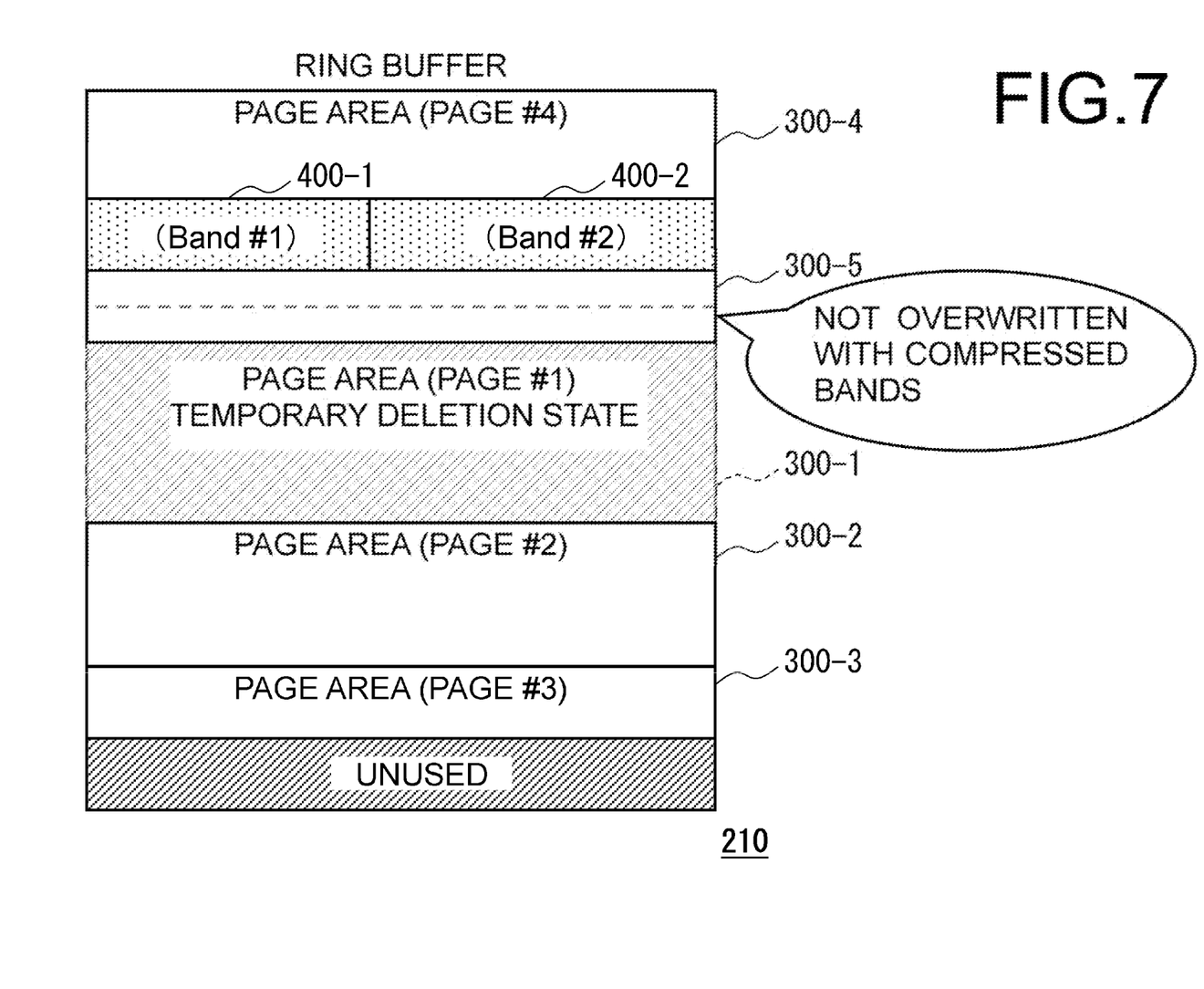
FIG. 7 is a conceptual diagram of the imaging process for printing as shown in FIG. 3.

FIG. 7 shows an example in which the page area 300-5 is not actually overwritten because the size of the compressed image data is small. That is, in this example, the band data 400-1 (Band #1) and the band data 400-2 (Band #2) do not overwrite the location of the temporarily deleted page area 300-1.

In consideration of such a situation, the page area setting unit 100 determines the presence/absence of overwriting by the storage capacity of the band data 400 actually stored, not by the storage capacity allocated as the page area 300.

The page area setting unit 100 determines Yes if the temporarily deleted page area 300 has already been overwritten. In other cases, that is, in the case where the page area 300 has not been overwritten, the page area setting unit 100 determines No.

In the case of Yes, the page area setting unit 100 advances the process to step S111.

In the case of No, the page area setting unit 100 advances the process to step S110.

(Step S110)

If the page area 300 has not been overwritten, the page area setting unit 100 performs area reusing process.

When the page area 300 in the temporarily deletion state is needed again and is not actually deleted, the page area setting unit 100 reuses the page area 300.

Figure 8:
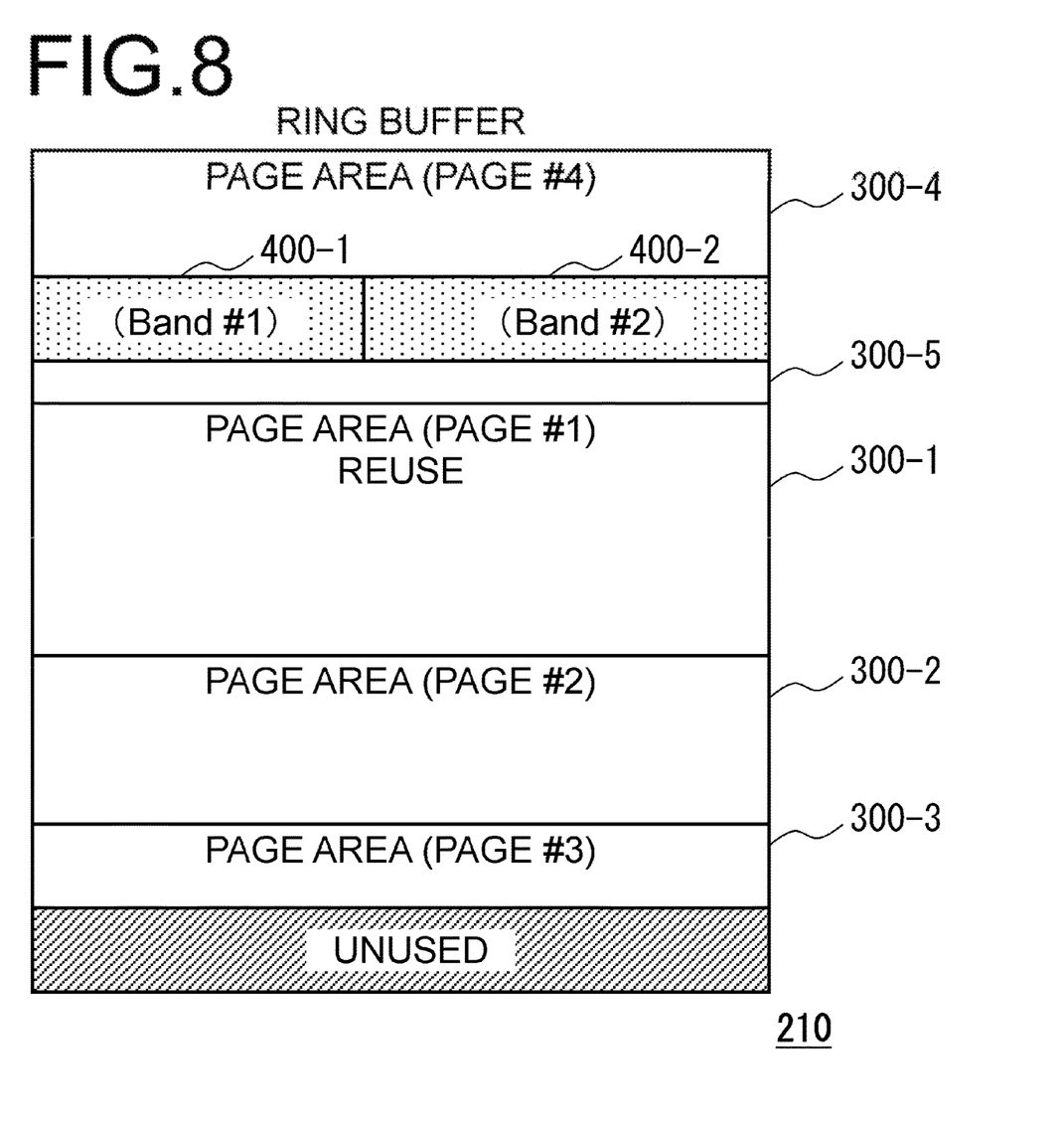
FIG. 8 is a conceptual diagram of the imaging process for printing as shown in FIG. 3.

In the example of FIG. 8, the page area setting unit 100 returns the page area 300-1 to the in-use state and reuses the stored band data 400. At this time, the page area setting unit 100 resets the location of the page area 300 of the memory management table from "temporary deletion" to "allocated." In addition, the page area setting unit 100 may set the storage capacity of the page area 300-5 only before the page area 300-1 or only on the location of the band data 400s that are actually stored.

After that, the page area setting unit 100 advances the process to step S114.

(Step S111)

If the page area 300 has already been overwritten, the page area setting unit 100 performs area allocating process.

Here, the page area setting unit 100 completely releases the temporarily deleted and already overwritten page area 300. That is, the location of "temporary deletion" in the page area 300 of the memory management table is set to "unused".

Then, the page area setting unit 100 allocates the page area 300 of the maximum size in page units, as in step S102 as described above.

(Step S112)

Next, the band storing unit 110 performs band storing process.

The band storage unit 110 again reads the image data in page units of the job data 200 from the HDD, or the like, of the auxiliary storage unit 19b, as in step S103 described above. Then, the band storage unit 110 divides this image data into band data 400, compresses and stores it.

(Step S113)

Next, the image processing unit 11 performs image processing process.

This process is also performed in the same manner as step S104 as described above.

(Step S114)

Here, the image forming unit 17 and the page area setting unit 100 perform image forming process.

In this process as well, the image forming unit 17 forms the image of the band data 400 for each page, as in step S105 as described above. At this time, the band data 400 to the image formation, as described above, are reused, or are newly read from the HDD, or the like, in which the image has been processed.

As described above, the printing image process according to the embodiment of the present disclosure is completed.

With the above configuration, the following effects can be obtained.

Although a typical technology used a ring buffer, nothing was known about its efficient use.

Regarding this, it is conceivable to release and delete the page area on the ring buffer early without waiting until the recording sheet is completely discharged. This is because the processing for the following pages is performed in advance.

However, at the time of the copy printing, the page area is allocated in the ring buffer, but when the previous job is using it, waiting until the area is released is required. In the cases other than the copy printing, if the paper jam occurs, the band data on the ring buffer is desired to be used, but if the image formation has already been completed, this data is simply deleted and thus cannot be used. That is, actually even if Page #1 of the page area has not been overwritten, reading and performing image processing again from the HDD, or the like, of the Page #1 is required. Therefore, there are cases where the ring buffer cannot be used efficiently.

On the other hand, in the image forming apparatus 1 according to the embodiment of the present disclosure includes: a storage unit 19 that sets with a ring buffer 210; a page area setting unit 100 that allocates a maximum-sized page area 300 for each page of a job in the ring buffer 210 set in the storage unit 19; a band storing unit 110 that stores band data 400 while compressing in the page area 300 allocated by the page area setting unit 100; an image processing unit 11 that performs image processing of the band data 400 stored by the band storing unit 110; an image forming unit 17 that forms an image of the band data 400 performed image processing by the image processing unit 11; and a temporary deletion unit 120 that sets the page area 300 where all the band data 400 is image-formed by the image forming unit 11 to a temporary deletion state allowing to be overwritten; wherein the page area setting unit 100, when the band data 400 of the page is needed again and the page area 300 set to the temporary deletion state by the temporary deletion unit 120 is not overwritten, reuses the page area 300.

With this configuration, the page area 300 on the ring buffer 210 is set to the temporary deletion state at a specific timing. Then, if reusing the page area 300 in the temporarily deleted state is desired and the page area 300 is not overwritten, the page area 300 can be reused as it is. That is, the page area 300 is treated as usable, the page area 300 for the next page and subsequent pages is allocated, and if the deleted band data 400 becomes necessary again, the page area 300 temporarily deleted on the ring buffer 210 is reused.

As a result, the storage capacity of the ring buffer 210 can be effectively used. Specifically, even if the band data 400 is needed again, it can be reused. Therefore, reading from the HDD, or the like, and performing image processing again becomes not to be necessary, high-speed printing can be realized, and user convenience can be improved.

Further, in the image forming apparatus 1 according to the embodiment of the present disclosure, the page area setting unit 100, when the page area 300 set to the temporary deletion state by the temporary deletion unit 120 has already been overwritten, newly allocates the page area 300.

With this configuration, when the deleted page area 300 is needed again, if it has already been overwritten, the image data from the HDD, or the like, of the auxiliary storage unit 19b is acquired and the image processing is performed. Thus, printing can be performed reliably. Therefore, the management efficiency of the storage capacity of the ring buffer 210 can be optimized.

Further, in the image forming apparatus 1 according to the embodiment of the present disclosure, the page area setting unit 100 determines the band data 400 of the page is needed again when the copy printing is set for the job and/or when the job is reprinted.

With this configuration, the reliable determination that the band data 400 is needed again when the copy printing or reprinting can be achieved. Therefore, the ring buffer 210 can be used efficiently.

In the image forming apparatus 1 according to the embodiment of the present disclosure, the page area setting unit 100, when the band data 400 of the page is needed again, determines whether or not the page area 300 set to the temporary deletion state by the temporary deletion unit 120 is overwritten in units of band data 400.

With this configuration, the storage capacity of the ring buffer 210 can be used more effectively. That is, when the page area 300 is allocated in the ring buffer 210, the capacity is allocated in consideration of the minimum compression rate of the band data 400, but the capacity of the band data 400 after compression becomes small, so that the page area 300 is not always actually overwritten. Therefore, whether to be overwritten can be confirmed by the storage capacity of the band data 400 actually stored, not by the storage capacity allocated as the page area 300. As a result, the ring buffer 210 can be used efficiently.

Further, in the image forming apparatus 1 according to the embodiment of the present disclosure, the temporary deletion unit 120 sets the page to the temporary deletion state when the band data 400 in the page are all image-formed as the specific timing.

With this configuration, the page area 300 on the ring buffer 210 can be quickly set to the temporary deletion state in a state where an image is transferred onto the intermediate transfer belt, or the like. That is, waiting for the recording sheet to be ejected may not be necessary. In addition, if the recording sheet is jammed after the transfer and before the discharge is completed, the data in the temporarily deleted page area 300 can be effectively used again.

Further, in the image forming apparatus 1 according to the embodiment of the present disclosure, the page area setting unit 100 determines that reprinting is necessary when a paper jam occurs.

With this configuration, it is possible to effectively use the band data 400 that has undergone image processing when a paper jam occurs as reprinting.

Other Embodiments

In addition, in the above-described embodiment, the ring buffer 210 is described as an example in which the page area 300 is allocated from a small address to a large address (ascending order) in the memory space.

However, in the ring buffer 210, the page area 300 may be allocated from a large address to a small address (descending order). In either case, the address at which the page area 300 is initially allocated can be set as the "head".

In the above embodiment, it is described that overwriting is determined based on the storage status of the band data 400.

However, it is also possible to determine overwriting based on only the storage capacity allocated as the page area 300. That is, for example, if the situation as shown in FIG. 6 occurs, the page area 300-1 may be completely released.

With this configuration, determining data being overwritten more quickly and using the storage capacity of the ring buffer 210 more efficiently depending on the job status can be achieved. That is, when printing a plurality of jobs simultaneously by using the ring buffer 210, the possibility of being more efficient can be increased.

Therefore, the page area setting unit 100 can also switch between overwriting confirmation in units of band data 400 and overwriting confirmation in units of page areas 300 based on the number of job data 200, the number of simultaneous prints, or the like.

In the above-described embodiment, the example in which the band data 400 of the page is determined to be necessary again in the case of the copy printing and the paper jam has been described.

However, in addition to this, the page data of the job data 200 may be compared with each other, and when printing a page or band having the same content, the band data 400 of the page can be determined to be needed again. Alternatively, by comparing the band data 400s on the ring buffer 210 with each other, they can be determined to be needed again.

With this configuration, the utilization efficiency of the ring buffer 210 can be further improved.

In the above-described embodiment, it has been described that all the page areas 300 of each page of the job data 200 are allocated on the ring buffer 210, the band data 400 is stored on them, and image processing is performed.

However, the page area 300 of one page or a couples of pages may be allocated, the band data 400 may be stored while being compressed, image processing may be performed, and then the page area 300 of the next page may be allocated. Alternatively, the page area 300 of one page or several pages may be allocated, and the band data 400 is stored while being compressed, then the page area 300 of the next page is reserved, at the same time, the image processing unit 11 may perform image processing in parallel.

With this configuration, to efficiently perform processing depending on the job status is possible.

In the above embodiment, the storage capacity of the ring buffer 210 is fixed, but it may be variable.

As a result, the storage capacity of the ring buffer 210 can be utilized more flexibly.

In addition, the present disclosure can also be applied to information processing apparatuses other than the image forming apparatus. That is, the configuration may be such that a network scanner, a server, or the like, to which the scanner is separately connected by USB, or the like, is used.

Further, it is needless to say that the configurations and operations of the above-described embodiments are examples and can be appropriately modified and executed without departing from the aim of the present disclosure.

What is claimed is:

1. An image processing apparatus comprising:
   a storage unit configured to be set with a ring buffer;
   a page area setting unit configured to allocate a maximum-sized page area for each page of a job in the ring buffer set in the storage unit;
   a band storing unit configured to store band data while compressing in the page area allocated in the page area setting unit;
   an image processing unit configured to perform image processing of the band data stored by the band storing unit; and
   a temporary deletion unit configured to set the page area having the band data performed image processing by the image processing unit to a temporary deletion state allowing to be overwritten at a specific timing; wherein
   the page area setting unit,
   when the band data of the page is needed again and the page area set to the temporary deletion state by the temporary deletion unit is not overwritten, reuses the page area.

2. The image processing apparatus according to claim 1, wherein:
   the page area setting unit,
   when the page area set to the temporary deletion state by the temporary deletion unit has already been overwritten, newly allocates the page area.

3. The image processing apparatus according to claim 1, wherein:
   the page area setting unit,
   when a copy printing is set for the job and/or when the job is reprinted, determines that the band data of the page is needed again.

4. The image processing apparatus according to claim 1, wherein:
   the page area setting unit,
   when the band data of the page is needed again, determines whether or not the page area set to the temporary deletion state by the temporary deletion unit is overwritten in band data units.

5. The image processing apparatus according to claim 1, wherein:
   the temporary deletion unit
   sets the page to the temporary deletion state when the band data in the page is all image-formed as the specific timing.

6. An image forming apparatus comprising:
   a storage unit configured to be set with a ring buffer;
   a page area setting unit configured to allocate a maximum-sized page area for each page of a job in the ring buffer set in the storage unit;
   a band storing unit configured to store band data while compressing in the page area allocated by the page area setting unit;
   an image processing unit configured to perform image processing of the band data stored by the band storing unit;
   an image forming unit configured to form an image of the band data performed image processing by the image processing unit; and
   a temporary deletion unit configured to set the page area where all the band data is image-formed by the image forming unit to a temporary deletion state allowing to be overwritten; wherein
   the page area setting unit,
   when the band data of the page is needed again and the page area set to the temporary deletion state by the temporary deletion unit is not overwritten, reuses the page area.

7. The image forming apparatus according to claim 6, wherein:
   the page area setting unit,
   when the page area set to the temporary deletion state by the temporary deletion unit has already been overwritten, newly allocates the page area.

8. The image forming apparatus according to claim 6, wherein:
   the page area setting unit,
   when a copy printing is set for the job and/or when the job is reprinted, determines that the band data of the page is needed again.

9. The image forming apparatus according to claim 8, wherein:
   the page area setting unit determines that the reprint is necessary when a paper jam occurs.

10. The image forming apparatus according to claim 6, wherein:
    the page area setting unit,
    when the band data of the page is needed again, determines whether or not the page area set to the temporary deletion state by the temporary deletion unit is overwritten in band data units.

11. An image processing method being executed by an image processing apparatus, comprising the steps of:
    setting a ring buffer;
    allocating a maximum-sized page area for each page of a job in the ring buffer that is set;
    storing band data while compressing in the page area that is allocated;
    performing image processing of the band data that is stored;
    setting the page area having the band data performed image processing to a temporary deletion state allowing to be overwritten at a specific timing; and
    reusing the page area when the band data of the page is needed again and the page area set to the temporary deletion state is not overwritten.

12. The image processing method according to claim 11, wherein:
    newly allocating the page area when the page area set to the temporary deletion state has already been overwritten.

13. The image processing method according to claim 11, wherein:
    determining, when a copy printing is set for the job and/or when the job is reprinted, that the band data of the page is needed again.

14. The image processing method according to claim 11, wherein:
    determining, when the band data of the page is needed again, whether or not the page area set to the temporary deletion state is overwritten in band data units.

15. The image processing method according to claim 11, wherein:
    setting the page to the temporary deletion state when the band data in the page is all image-formed as the specific timing.

* * * * *